(12) United States Patent
Han et al.

(10) Patent No.: US 10,908,644 B2
(45) Date of Patent: Feb. 2, 2021

(54) DISPLAY DEVICE INCLUDING A HINGE AND SUPPORT PORTIONS HAVING AN INCREASING THICKNESS

(71) Applicant: Samsung Display Co., Ltd., Yongin-Si (KR)

(72) Inventors: Jiwon Han, Anyang-si (KR); Jaiku Shin, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/520,565

(22) Filed: Jul. 24, 2019

(65) Prior Publication Data
US 2020/0133338 A1 Apr. 30, 2020

(30) Foreign Application Priority Data

Oct. 30, 2018 (KR) .................. 10-2018-0130661

(51) Int. Cl.
*G06F 1/16* (2006.01)
*H04M 1/02* (2006.01)

(52) U.S. Cl.
CPC .......... *G06F 1/1641* (2013.01); *G06F 1/1652* (2013.01); *G06F 1/1681* (2013.01); *H04M 1/0216* (2013.01)

(58) Field of Classification Search
CPC ... G06F 1/1652; G06F 1/1681; H04M 1/0268
See application file for complete search history.

(56) References Cited

U.S. PATENT DOCUMENTS

| 6,377,324 B1 * | 4/2002 | Katsura ............. G02F 1/133305 |
| | | 349/58 |
| 6,577,496 B1 * | 6/2003 | Gioscia ................. G06F 1/1616 |
| | | 345/156 |
| 8,804,349 B2 * | 8/2014 | Lee ........................ G06F 1/1641 |
| | | 361/749 |
| 9,812,074 B2 | 11/2017 | Phillips |
| 10,164,208 B2 | 12/2018 | Lee et al. |

(Continued)

FOREIGN PATENT DOCUMENTS

| KR | 10-2017-0061804 | 6/2017 |
| KR | 10-2018-0062271 | 6/2018 |
| KR | 10-2018-0079091 | 7/2018 |

*Primary Examiner* — Adrian S Wilson
(74) *Attorney, Agent, or Firm* — F. Chau & Associates, LLC

(57) ABSTRACT

A display device includes a first support portion and a second support portion arranged in a first direction with the first support portion. The display device further includes a display panel disposed on the first and second support portions, and a hinge configured to provide first and second rotation axes to the first and second support portions, respectively, the first and second rotation axes extending in a second direction crossing the first direction. A thickness of the first support portion increases from a first side surface of the first support portion toward a second side surface of the first support portion. A thickness of the second support portion increases from a first side surface of the second support portion toward a second side surface of the second support portion. The first side surface of the second support portion faces the first side surface of the first support portion.

20 Claims, 9 Drawing Sheets

(56) References Cited

U.S. PATENT DOCUMENTS

| | | | | |
|---|---|---|---|---|
| 2006/0050169 A1* | 3/2006 | Misawa | ............... | G06F 1/1616 |
| | | | | 348/333.06 |
| 2012/0236484 A1* | 9/2012 | Miyake | ............... | G06F 1/1616 |
| | | | | 361/679.01 |
| 2012/0307423 A1* | 12/2012 | Bohn | ................. | G06F 1/1652 |
| | | | | 361/679.01 |
| 2015/0241925 A1* | 8/2015 | Seo | .................... | G06F 1/1681 |
| | | | | 361/679.27 |
| 2015/0378397 A1* | 12/2015 | Park | .................... | G06F 1/1652 |
| | | | | 361/679.27 |
| 2018/0192527 A1 | 7/2018 | Yun et al. | | |

\* cited by examiner

DISPLAY DEVICE INCLUDING A HINGE AND SUPPORT PORTIONS HAVING AN INCREASING THICKNESS

CROSS-REFERENCE TO RELATED APPLICATION

This U.S. non-provisional patent application claims priority under 35 § 119 to Korean Patent Application No. 10-2018-0130661, filed on Oct. 30, 2018, the disclosure of which is incorporated by reference herein in its entirety.

TECHNICAL FIELD

The present inventive concept relates to a display device, and more particularly, to a display device including a hinge and support portions having an increasing thickness.

DISCUSSION OF THE RELATED ART

An electronic device such as a smartphone, a digital camera, a notebook computer, a navigation device, a smart television (TV), or the like, which provides an image to a user, includes a display device configured to display the image. The display device generates an image and provides the image to a user through a display screen.

Recently, various types of display devices are being developed. For example, various flexible display devices, which may be folded or rolled in a curved type, are being developed. The flexible display devices, which include shapes that may be modified in various ways, may be easily carried and may increase user convenience.

A folding display device among the flexible display devices includes a display module folded about a folding axis extended in one direction. The display module is folded or unfolded about the folding axis. However, when the display module is repeatedly folded and unfolded, a folding area, which extends along the folding axis, of the display module may be stretched, modified or deformed. The modified folding area may be visually recognized by a user when compared to the original look of the folding area.

SUMMARY

According to an exemplary embodiment of the present inventive concept, a display device includes: a first support portion; a second support portion arranged in a first direction with the first support portion; a display panel disposed on the first and second support portions; and a hinge configured to provide first and second rotation axes to the first and second support portions, respectively, the first and second rotation axes extending in a second direction crossing the first direction. A thickness of the first support portion increases from a first side surface of the first support portion toward a second side surface of the first support portion. A thickness of the second support portion increases from a first side surface of the second support portion toward a second side surface of the second support portion. The first side surface of the second support portion faces the first side surface of the first support portion.

In an exemplary embodiment of the present inventive concept, a shape of the first support portion is symmetric to the second support portion about a center part of the display panel.

In an exemplary embodiment of the present inventive concept, lower surfaces of the first and second support portions each have a plane that is parallel to the first and second directions.

In an exemplary embodiment of the present inventive concept, the first side surface of the first support portion and the lower surface of the first support portion are substantially perpendicular to each other.

In an exemplary embodiment of the present inventive concept, the first side surface of the second support portion and the lower surface of the second support portion are substantially perpendicular to each other.

In an exemplary embodiment of the present inventive concept, upper surfaces of the first and second support portions are inclined planes that make a first angle with the first direction, wherein the upper surface of the first support portion and the upper surface of the second support portion are symmetric to each other with respect to a center part of the display panel.

In an exemplary embodiment of the present inventive concept, the first angle is about 0.5 degree to about 1.5 degrees.

In an exemplary embodiment of the present inventive concept, the first side surface of the first support portion and the upper surface of the first support portion are substantially perpendicular to each other.

In an exemplary embodiment of the present inventive concept, the first side surface of the second support portion and the upper surface of the second support portion are substantially perpendicular to each other.

In an exemplary embodiment of the present inventive concept, the display panel includes: a first non-folding area; a second non-folding area; and a folding area disposed between the first non-folding area and the second non-folding areas and overlapping the first and second rotation axes.

In an exemplary embodiment of the present inventive concept, the display device further includes an adhesive member disposed between the display panel and the first support portion and between the display panel and the second support portion.

In an exemplary embodiment of the present inventive concept, the display device further includes: a first coating layer disposed between a part of an upper surface of the first support portion and the adhesive member, wherein the part of the upper surface of the first support portion is adjacent to the first side surface of the first support portion; and a second coating layer disposed between a part of an upper surface of the second support portion and the adhesive member, wherein the part of the upper surface of the second support portion is adjacent to the first side surface of the second support portion.

In an exemplary embodiment of the present inventive concept, the first and second coating layers overlap the folding area and are not attached to the adhesive member at the fielding area.

In an exemplary embodiment of the present inventive concept, the first rotation axis is provided at a part of the first support portion. The part of the first support portion is adjacent to the first side surface of the first support portion. The second rotation axis is provided at a part of the second support portion. The part of the second support portion is adjacent to the first side surface of the second support portion.

In an exemplary embodiment of the present inventive concept, the first and second support portions rotate about the first and second rotation axes, respectively, and the display panel is configured to fold inward so that the first and second non-folding areas face each other.

In an exemplary embodiment of the present inventive concept, when the display panel is in an unfolded mode, an angle made by the first non-folding area and the second non-folding area is greater than about 177 degrees and less than 180 degrees.

In an exemplary embodiment of the present inventive concept, the display device further includes a case configured to accommodate the display panel and the first and second support portions. An upper surface of the display panel includes a display area and a non-display area configured to at least partially surround the display area, and the case covers the non-display area.

According to an exemplary embodiment of the present inventive concept, a display device includes: a first support portion; a second support portion arranged in a first direction with the first support portion; and a display panel disposed on the first and second support portions. A lower surface of the first support and a lower surface of the second support portion have planes defined by the first direction and a second direction crossing the first direction, and an upper surface of the first support and an upper surface of the second support portion make a first angle with the first direction and are symmetric to each othersupport portionsupport portionsupport portionsupport portionsupport portionsupport portion.

In an exemplary embodiment of the present inventive concept, a height of the upper surface of the first support portion increases from a first side surface of the first support portion toward a second side surface of the first support portion. A height of the upper surface of the second support portion increases from a first side surface of the second support portion toward a second side surface of the second support portion. The first side surface of the first support portion faces the first side surface of the second support portion.

In an exemplary embodiment of the present inventive concept, the first side surface of the first support portion and the lower surface of the first support portion are substantially perpendicular to each other, and the first side surface of the second support portion and the lower surface of the second support portion are substantially perpendicular to each other.

BRIEF DESCRIPTION OF THE FIGURES

The above and other features of the present inventive concept will become more apparent by describing in detail exemplary embodiments thereof, with reference to the accompanying drawings, in which.

DETAILED DESCRIPTION OF THE EMBODIMENTS

Figure 1:
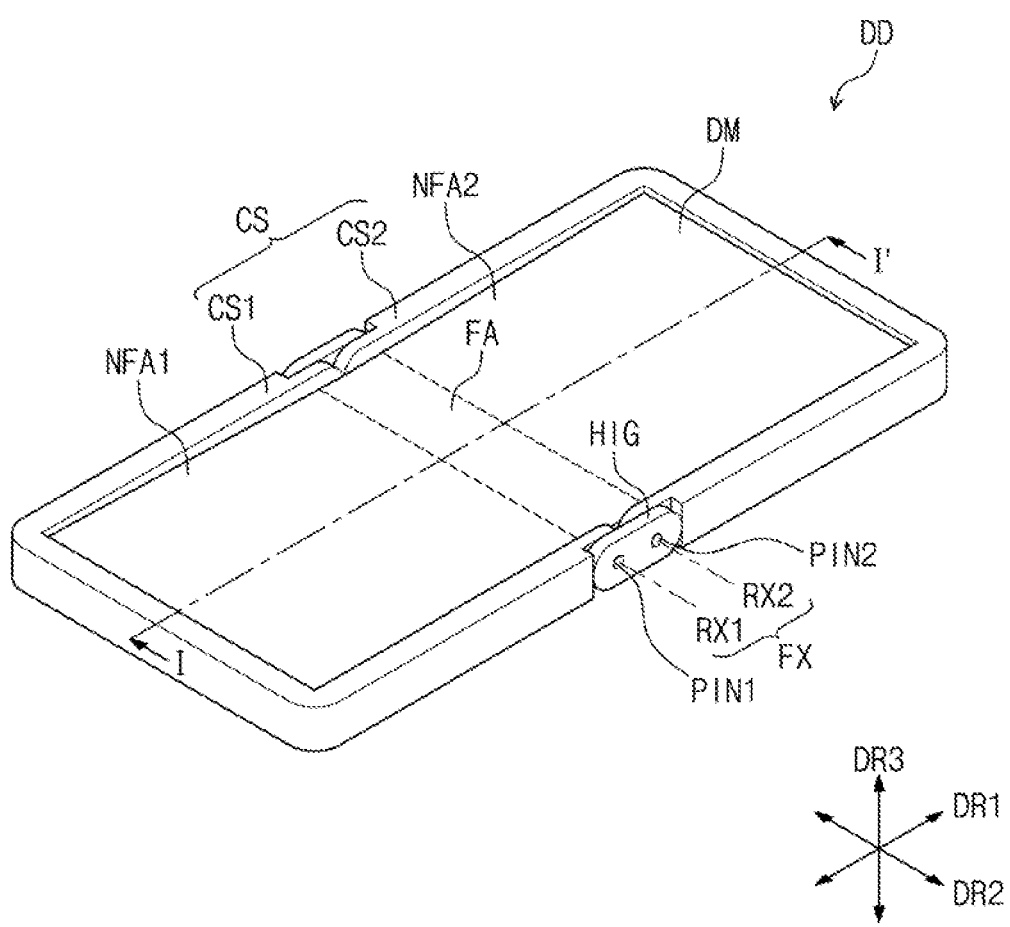
FIG. 1 is a perspective view of a display device according to an exemplary embodiment of the present inventive concept.

Exemplary embodiments of the present inventive concept will now be described more fully with reference to the accompanying drawings. It is to be understood that the present inventive concept may be embodied in different forms and thus should not be construed as being limited to the exemplary embodiments set forth herein.

It will be understood that when an element or layer is referred to as being "on", "connected to" or "coupled to" another element or layer, the element or layer can be directly on, connected or coupled to the other element or layer or intervening elements or layers may be present.

Like reference numerals in the drawings may refer to like elements, and thus repetitive descriptions may be omitted. In addition, in the drawings, thicknesses, ratios and dimensions of the element may be exaggerated for clarity.

It will be understood that, although the terms such as first, second, and the like may be used to describe various components, but these components should not be limited by the terms. The terms are used only for the purpose of distinguishing one component from another component. For instance, a first component may be referred to as a second component, or similarly, a second component may be referred to as a first component, without departing from the spirit and scope of the present inventive concept.

In addition, the terms such as "below" "beneath", "under", "lower", "on", "above" and "upper" may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, in the example, terms "below" and "beneath" may encompass an orientation of above, below and beneath. The device may be otherwise oriented (e.g., rotated 90 degrees or at other orientations) and the spatially relative descriptors used herein may be interpreted accordingly.

Hereinafter, exemplary embodiments of the present inventive concept will be described in detail with reference to the accompanying drawings.

FIG. 1 is a perspective view of a display device according to an exemplary embodiment of the present inventive concept.

In relation to FIG. 1, the display device DD according to an exemplary embodiment of the present inventive concept may include a display module DM, a case CS configured to accommodate the display module DM, and a hinge HIG connected to the case CS and configured to provide a folding axis FX to the display device DD.

The display module DM may have a plane parallel to a first direction DR1 and a second direction DR2 crossing the first direction DR1. Hereinafter, a third direction DR3 may be by a direction substantially perpendicular to the first and second directions DR1 and DR2. The display module DM may be a flexible display module DM.

The display module DM may include a folding area FA and a plurality of non-folding areas NFA1 and NFA2. The folding area FA may be disposed between the non-folding areas NFA1 and NFA2. The folding area FA and the non-folding areas NFA1 and NFA2 may be arranged in the first direction DR1. The non-folding area NFA1 and NFA2 may include the first non-folding area NFA1 and the second non-folding area NFA2.

For example, one folding area FA and two non-folding areas NFA1 and NFA2 are illustrated, but the numbers of folding areas FA and the non-folding areas NFA1 and NFA2 are not limited thereto. For example, the display module DM may include more than two non-folding areas and a plurality of folding areas disposed between the non-folding areas.

The case CS may include a first case CS1 and a second case CS2. The first case CS1 and the second case CS2 may be connected to each other to accommodate the display module DM, and cover edges of the display module DM. For example, the display module DM may be disposed in the first case CS1 and the second case CS2.

The hinge HIG may be connected to one side of the first case CS1 and one side of the second case CS2, and the first case CS1 and the second case CS2 face each other. For example, a first pin unit PIN1 and a second pin unit PIN2 are inserted into the hinge HIG. The first pin unit PIN1 may be inserted into one side of the first case CS1, and the second pin unit PIN2 may be inserted into one side of the second case CS2. Accordingly, the hinge HIG may be connected to the first and second cases CS1 and CS2 by the first and second pin units PIN1 and PIN2.

The hinge HIG may provide the folding axis FX parallel to the second direction DR2 to the display device DD. The display device DD may be folded about the folding axis FX. For example, the folding axis FX may include a first rotation axis RX1 and a second rotation axis RX2 extended in the second direction DR2 and disposed adjacent to each other. The first rotation axis RX1 and the second rotation axis RX2 may be a double rotation axis.

The first and second rotation axes RX1 and RX2 overlap the folding area FA, and the display device DD may be folded about the first rotation axis RX1 and the second rotation axis RX2. The first rotation axis RX1 may be provided by the first pin unit PIN1, and the second rotation axis RX2 may be provided by the second pin unit PIN2. Although not shown in the drawing, the first and second pin units PIN1 and PIN2 may be extended in the second direction DR2 like the first and second rotation axes RX1 and RX2.

The first and second cases CS1 and CS2 connected to the hinge HIG may rotate along the first and second rotation axes RX1 and RX2, respectively. Accordingly, the display module DM accommodated in the first and second cases CS1 and CS2 may be folded and unfolded according to movements of the first and second cases CS1 and CS2. For example, as the first case CS1 rotates along the first rotation axis RX1, the display module DM may fold or unfold, and as the second case CS2 rotates along the second rotation axis RX2, the display module DM may fold or unfold.

The display device DD illustrated in FIG. 1 may be used in various electronic devices for displaying an image. For example, the display device DD may be used in electronic devices such as a television, a monitor, a personal computer, a notebook computer, a personal digital assistant, a smart-phone, a tablet and a camera. However, these are presented as exemplary embodiments of the present inventive concept, and may be adopted in another electronic device without departing from the spirit and scope of the present inventive concept.

Figure 2:
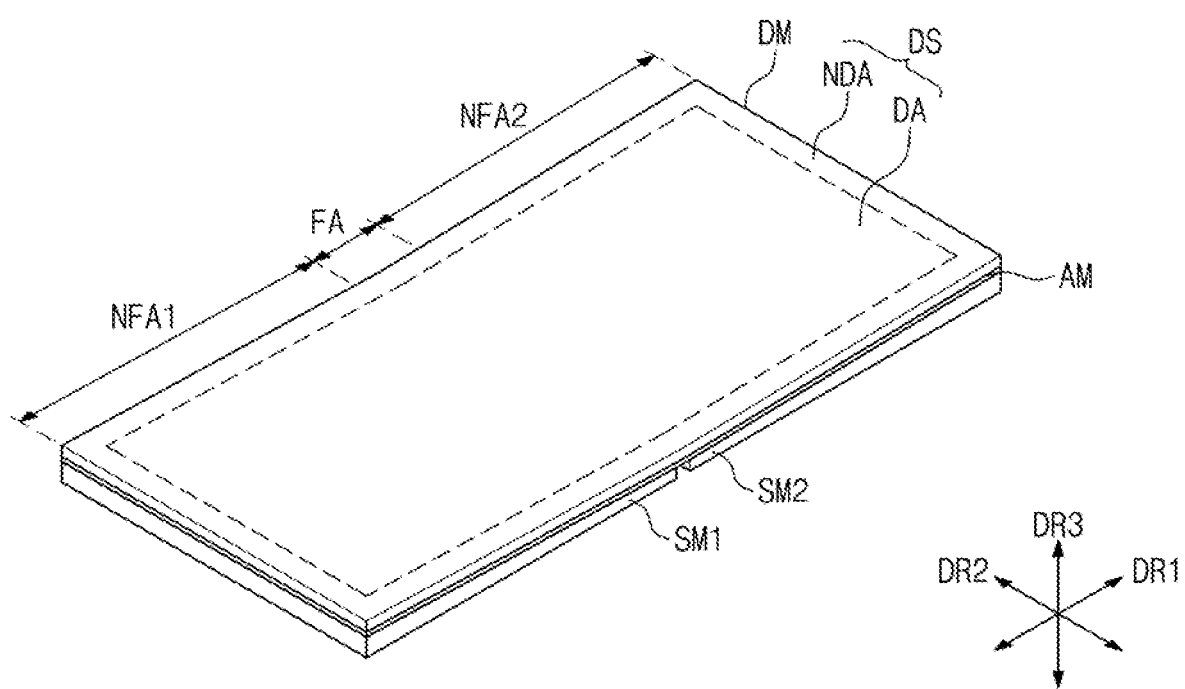
FIG. 2 is a perspective view of a display module and a plurality, of support portions accommodated in a case shown in FIG. 1.

FIG. 2 is a perspective view of a display module, and a plurality of support portions accommodated in the case shown in FIG. 1.

In relation to FIG. 2, the display device DD may include a display module DM, first and second support portions SM1 and SM2, and an adhesive member AM. The display module DM may have a rectangular shape including the long sides in the first direction DR1 and the short sides in the second direction DR2, but the shape of the display module DM is not limited thereto.

The top surface of the display module DM may be a display surface DS. The display surface DS may include a display area DA and a non-display area NDA at least partially surrounding the display area DA. An image may be provided to a user through the display area DA.

The folding area FA may overlap a part of the display area DA and a part of the non-display area NDA. Each of the first and second non-folding areas NFA1 and NFA2 may overlap the other part (e.g., the remaining part) of the display area DA and the other part (e.g., the remaining part) of the non-display area NDA.

The first support portion SM1 and the second support portion SM2 may be respectively disposed on lower portions (e.g., lower surfaces) of the display module DM at the first and second non-folding areas NFA1 and NFA2. The first support portion SM1 and the second support portion SM2 may be arranged in the first direction DR1. The first support portion SM1 and the second support portion SM2 may be separated from each other by a predetermined interval in the first direction DR1. One side of the first support portion SM1 and one side of the second support portion SM2, which face each other in the first direction DR1, may overlap the folding area FA. For example, the predetermined interval between the first support portion SM1 and the second support portion SM2 may overlap, at least, the folding area FA.

The thickness of the first support portion SM1 may become thicker from one (e.g., a first) side of the first support portion SM1 toward the other (e.g., a second) side of the first support portion. SM1 that is the opposite side of the one (e.g., the first) side of the first support portion SM1. The thickness of the first support portion SM1 may become thicker in the first direction DR1 away from the folding area FA. The one side and the other side of the first support portion SM1 may face each other in the first direction DR1.

The thickness of the second support portion SM2 may become thicker from one side of the second support portion SM2 toward the other side of the second support portion SM2 that is the opposite side of the one side of the second support portion SM1. The thickness of the second support portion SM2 may become thicker in the first direction DR1 away from the folding area FA. The one side and the other side of the second support portion SM2 may face each other in the first direction DR1.

The thickness of each of the first and second support portions SM1 and SM2 may be the distance between the lower surface and the upper surface of each of the first and second support portions SM1 and SM2 in the third direction DR3. The shape of the first support portion SM1 may be symmetric to the shape of the second support portion SM2 about the center part of the display module DM.

The adhesive member AM may be disposed in the lower part of the display module DM. For example, the adhesive member AM may be disposed in the non-folding areas NFA1 and NFA2 and the folding area FA; however, the present inventive concept is not limited thereto. For example, the adhesive member AM might not be disposed in the folding area FA. The adhesive member AM may be disposed between the display module DM and the first support portion SM1, and between the display module DM and the second support portion SM2. The adhesive member SM may attach the first and second support portions SM1 and SM2 to the display module DM.

For example, the adhesive member AM may include an optical clear adhesive or a pressure sensitive adhesive, hut is not limited thereto. The adhesive member AM may include various materials having adhesion.

Figure 3:
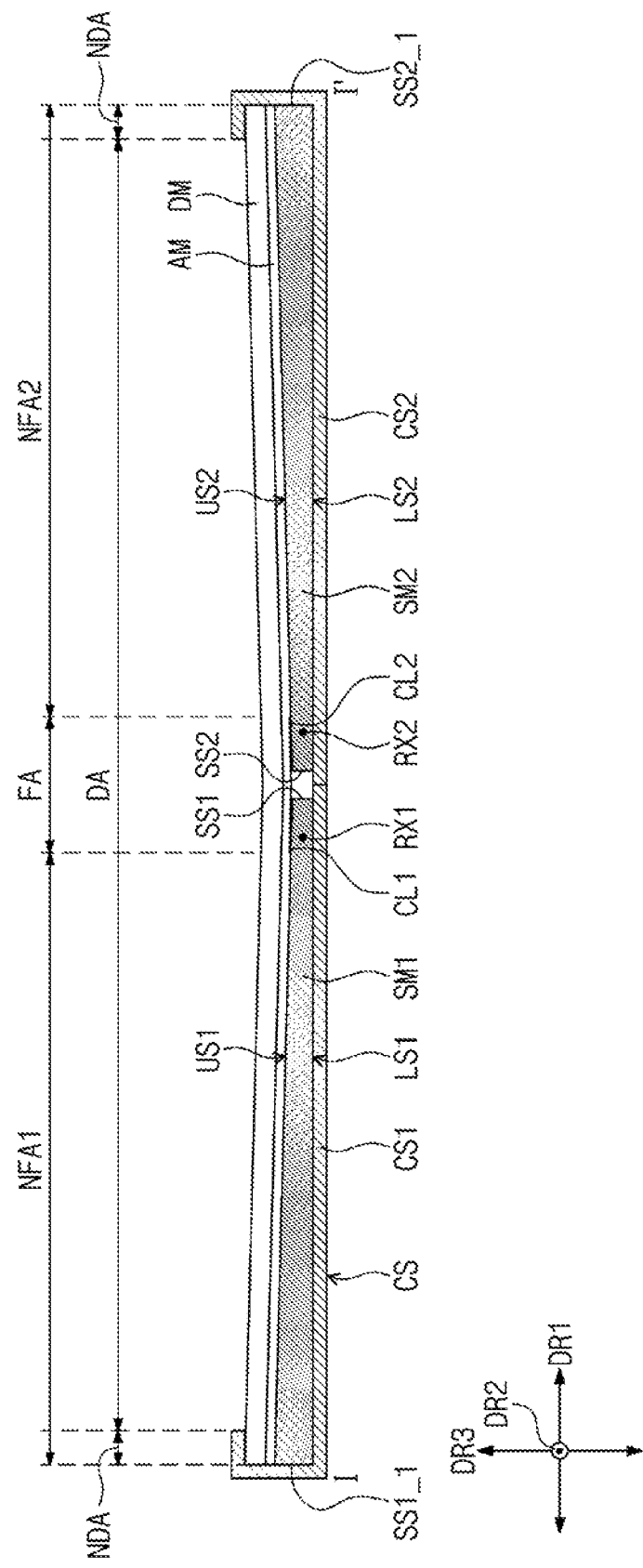
FIG. 3 is a cross-sectional view from line I-I' shown in FIG. 1.

FIG. 3 is a cross-sectional view from line I-I' shown in FIG. 1.

In relation to FIG. 3, the case CS may accommodate the display module DM and the first and second support portions SM1 and SM2. The case CS may cover at least a portion of the non-display area NDA. The lower portion of the first case CS1 and the lower portion of the second ease. CS2 may contact each other in a state where the first display module DM is unfolded. However, the present inventive concept is not limited thereto. For example, a deformable layer may connect the lower portion of the first case CS1 to the lower portion of the second case CS2.

The first case CS1 may accommodate the first non-folding area NFA1 and at least a part of the folding area FA adjacent to the first non-folding area NFA1. The second case CS2 may accommodate the second non-folding area NFA2 and at least a part of the folding area FA adjacent to the second non-folding area NFA2.

The first rotation axis RX1 may be provided at a portion of the first support portion SM1, which is adjacent to one side surface SS1 of the first support portion SM1. The second rotation axis RX2 may be provided at a portion of the second support portion SM2, which is adjacent to one side surface SS2 of the second support portion SM2. For example, the side surfaces SS1 and SS2 may face each other in the folding area FA and may extend in the third direction DR3. The first and second rotation axes RX1 and RX2 may overlap the folding area FA.

The thickness of the first support portion SM1 may increase from the one side surface SS1 of the first support portion SM1 toward the other side surface SS1_1 of the first support portion SM1. The one side surface SS1 and the other side surface SS1_1 of the first support portion SM1 may face each other in the first direction DR1.

The thickness of the second support portion SM2 may increase from the one side surface SS2 of the second support portion SM2 toward the other side surface SS2_1 of the second support portion SM2. The one side surface SS2 and the other side surface SS2_1 of the second support portion SM2 may face each other in the first direction DR1.

The lower surface LS1 of the first support portion SM1 may have a plane parallel to the first and second directions DR1 and DR2. The one side surface SS1 of the first support portion SM1 may be perpendicular to the lower surface LS1 of the first support portion SM1. The one side surface SS1 of the first support portion SM1 may be one side of the first support portion SM1.

The lower surface LS2 of the second support portion SM2 may have a plane parallel to the first and second directions DR1 and DR2. The one side surface SS2 of the second support portion SM2 may be perpendicular to the lower surface LS2 of the second support portion SM2. The one side surface SS2 of the second support portion SM2 may be one side of the second support portion SM2. The one side surface SS2 of the second support portion SM2 may face the one side surface SS1 of the first support portion SM1.

The upper surface US1 of the first support portion SM1, which is an opposite surface of the lower surface LS1 of the first support portion SM1, may be an inclined plane having a predetermined angle with the first direction DR1. The height of the upper surface US1 of the first support portion SM1 may increase, as it proceeds from the one side SS1 of the first support portion SM1 to the other side SS1_1 of the first support portion SM1.

The upper surface US2 of the second support portion SM2, which is an opposite surface of the lower surface LS2 of the second support portion SM2, may be an inclined plane having a predetermined angle with the first direction DR1. The height of the upper surface US2 of the second support portion SM2 may increase, as it proceeds from the one side SS2 of the second support portion SM2 to the other side SS2_1 of the second support portion SM2.

For example, the upper surfaces US1 and US2 of the first and second support portions SM1 and SM2 may be front surfaces of the first and second support portions SM1 and SM2. For example, the lower surfaces LS1 and LS2 of the first and second support portions SM1 and SM2 may be rear surfaces of the first and second members SM1 and SM2, which are opposite surfaces of the front surfaces of the first and second support portions SM1 and SM2, respectively.

The front surfaces of the first and second support portions SM1 and SM2 may face the rear surface of the display module DM, which is an opposite surface of the front surface of the display module DM. The front surface of the display module DM may be the display surface from which an image may be visually recognized.

For example, the upper surface US1 of the first support portion SM1 and the upper surface US2 of the second support portion SM2 may be inclined planes symmetric to each other. Accordingly, an angle of the upper surface US1 of the first support portion SM1 with the first direction DR1 may be the same as that of the upper surface US2 of the second support portion SM2 with the first direction DR1. However, exemplary embodiments of the present inventive concept are not limited thereto, and the angle of the upper surface US1 of the first support portion SM1 with the first direction DR1 may be different from that of the upper surface US2 of the second support portion SM2 with the first direction DR1.

The upper surfaces US1 and US2 of the first and second support portions SM1 and SM2 are inclined planes, and thus the display module DM disposed on the first and second support portions SM1 and SM2 may have the shape curved (or, e.g., bent) at a predetermined angle. For example, in the center part of the display module DM, the folding area FA is curved, and the first non-folding area NFA1 and the second non-folding area NFA2 may make an angle smaller than 180 degrees. The angle made by the first non-folding area NFA1 and the second non-folding area NFA2 will be described below with reference to FIG. 8.

A first coating layer CL1 may be disposed on at least a part of the upper surface US1 of the first support portion SM1, which is adjacent to the one side SS1 of the first support portion SM1. The first coating layer CF1 may be disposed between the part of the upper surface US1 of the first support portion SM1 and the adhesive member AM.

A second coating layer CL2 may be disposed on at least a part of the upper surface US2 of the second support portion SM2, which is adjacent to the one side SS2 of the second support portion SM2. The second coating layer CL2 may be disposed between the part of the upper surface US2 of the second support portion SM2 and the adhesive member AM.

The first and second coating layers CL1 and CL2 may overlap the folding area FA. However, the present inventive concept is not limited thereto. For example, the first and second coating layers CL1 and CL2 may also overlap the non-folding areas NFA1 and NFA2. The first and second coating layers CL1 and CL2 may not be attached to the adhesive members AM. For example, the first and second coating layers CL1 and CL2 may include fluorine. The first and second coating layers CL1 and CL2 may prevent the parts of the first and second support portions SM1 and SM2, which overlap the folding area FA, from being attached to the adhesive member AM.

Although not shown in the drawing, the hinge HIG may be connected to the first and second support portions SM1 and SM2 as well as to the first and second cases CS1 and CS2. For example, the first and second pin units PIN1 and PIN2 may penetrate through the first and second cases CS1 and CS2, be inserted into the first and second support portions SM1 and SM2, and then be connected to the first and second support portions SM1 and SM2. The first and second rotation axes RX1 and RX2 may be provided at the parts of the first and second support portions SM1 and SM2 into which the first and second pin units PIN1 and PIN2 are inserted.

Figure 4:
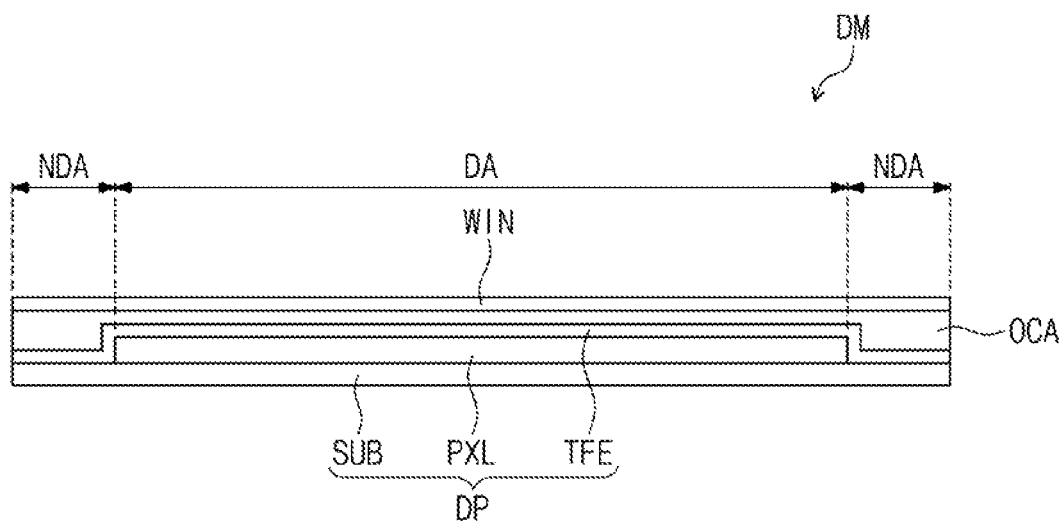
FIG. 4 schematically shows a cross section of the display module shown in FIG. 3.

FIG. 4 schematically shows a cross section of the display module shown in FIG. 3.

In relation to FIG. 4, the display module DM may include a display panel DP, a window WIN disposed on the display panel DP, and an adhesive OCA disposed between the display panel DP and the window WIN. For example, the display panel DP may be an organic light emitting display panel. However, exemplary embodiments of the present inventive concept are not limited thereto, and various image display panels such as a liquid crystal display panel, an electro wetting display panel, and an electrophoresis display panel, etc., which can display an image, may be used as the display panel DP.

The center part of the display module DM as described above may be the center part of the display panel DP. The folding area FA and the first and second non-folding areas NFA1 and NFA2 of the display module DM may substantially be the folding area FA and the first and second non-folding areas INFA1 and NFA2 of the display panel DP. The lower portion of the display panel DP may provide the lower portion of the display module DM. The shapes of the display module DM according to the unfolded state and the folded state of the display module DM may substantially be the shapes of the display panel DP in the unfolded and folded states.

The display panel DP may include a substrate SUB, a pixel layer PXL disposed on the substrate SUB, and a thin film encapsulation layer TFE disposed on the substrate SUB and the pixel layer PXL to cover the pixel layer PXL. For example, the substrate SUB may be a transparent substrate, and the substrate SUB may include a plastic substrate, a glass substrate, an organic/inorganic composite substrate, or the like. The substrate SUB may include a flexible plastic substrate.

Like the display module DM, the substrate SUB may include a display area DA and a non-display area NDA at least partially surrounding the display area DA. The pixel layer PXL may be disposed on the display area DA. The pixel layer PXL may include a plurality of pixels, and each pixel may include a light emitting element.

The thin film encapsulation layer TFE may include at least two inorganic layers and an organic layer disposed therebetween. The inorganic layers may include an inorganic material and protect the pixel layer PXL from moisture/oxygen. The organic layer may include an organic material and protect the pixel layer PXL from a foreign material such as a dust particle.

The window WIN may protect the display panel DP from an external scratch and an impact. The window WIN may be attached to the display panel DP by the adhesive OCA. For example, the adhesive OCA may include an optically clear adhesive.

An image generated in the display panel DP may be displayed through the window WIN for the user to view the generated image. Although not shown, a plurality of touch sensing units may be disposed between the window WIN and the display panel DP. The touch sensing units may sense an external touch (e.g., a finger of the user or a touch pen, etc.). The display panel DP may display an image corresponding to image data generated in response to an external touch sensed by the touch sensing units.

Figure 5:
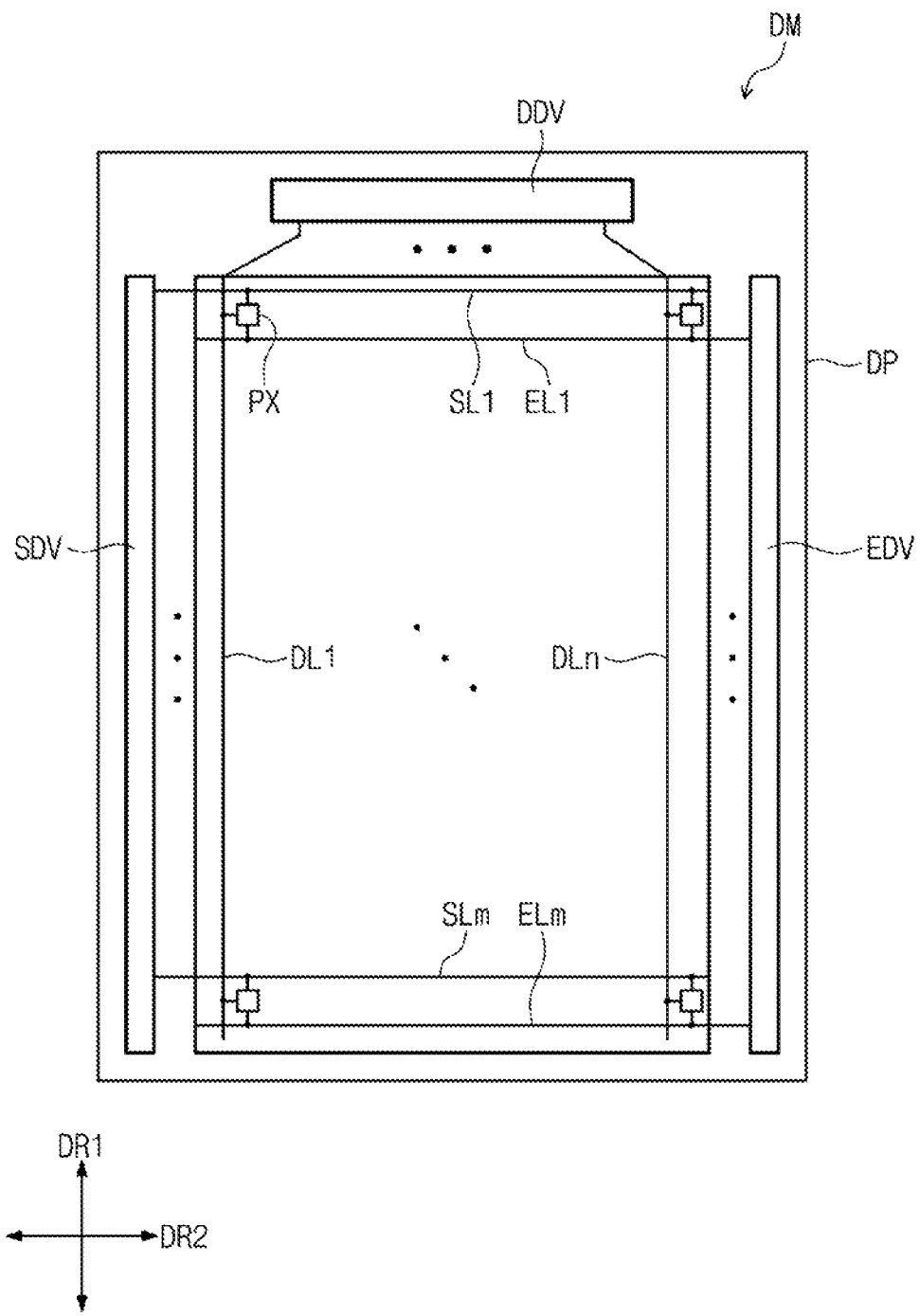
FIG. 5 is a plan view of the display module shown in FIG. 3.

FIG. 5 is a plan view of the display module shown in FIG. 3.

In relation to FIG. 5, the display module DM according to an exemplary embodiment of the present inventive concept may include the display panel DP, a scan driver SDV, a data driver DDV, and an emission driver EDV.

The display panel DP may be a flexible display panel. For example, the display panel DP may include a plurality of electronic elements disposed on a flexible substrate. The display panel DP may have a rectangular shape with the long sides in the first direction DR1 and the short sides in the second direction DR2. However, the present inventive concept is not limited thereto.

The display panel DP may have a plane parallel to the first and second directions DR1 and DR2. Like the display module DM, the display panel DP may include a display area DA and a non-display area NDA at least partially surrounding the display area DA. The display area DA may be an area on which an image is displayed, and the non-display area NDA may be an area on which an image is not displayed.

The display panel DP may include a plurality of pixels PX, a plurality of scan lines SL1 to SLm, a plurality of data lines DL1 to DLn, and a plurality of emission lines EL1 to Elm. Here, m and n are respectively natural numbers. The pixels PX may be arrayed in a matrix type, but the present inventive concept is not limited thereto and may be arrayed in various types. The pixels PX may be disposed on the display area DA, and connected to the scan lines SL1 to SLm, the data lines DL1 to DLn, and emission lines El1 to ELm The scan driver SDV, the data driver DDV, and the emission driver EDV may be disposed on the non-display area. For example, the scan driver say may be disposed in the non-display area NDA adjacent to one of the long sides of the display panels DP. The emission driver EDV may be disposed in the non-display area NDA adjacent to the other of the long sides of the display panel DP. The data driver DDV may be manufactured in an integrated circuit chip type and disposed in the non-display area NDA adjacent to any one of the short sides of the display panel DP.

The scan lines SL1 to SLm may be extended in the second direction DR2 to be connected to the scan driver SDV. The data lines DL1 to DLn may be extended in the first direction DR1 to be connected to the data driver DDV. The emission lines EL1 to Elm may be extended in the second direction DR2 to be connected to the emission driver EDV.

The scan driver SDV may generate a plurality of scan signals, and the scan signals may be applied to the pixels PX through the scan lines SL1 to SLm. The scan signals may be sequentially applied to the pixels PX.

The data driver DDV may generate a plurality of data voltages, and the data voltages may be applied to the pixels PX through the data lines DL1 to DLn. The emission driver EDV may generate a plurality of emission signals and the emission signals may be applied to the pixels PX through the emission lines EL1 to Elm.

Although not shown, the display module DM may include a timing controller for controlling operations of the scan driver SDV, the data driver DDV, and the emission driver EDV.

The timing controller may generate a scan control signal, a data control signal and an emission control signal in response to control signals received externally. The timing controller may receive image signals externally, convert the data format of the image signals to match the specification of an interface with the data driver DDV, and provide the converted signals to the data driver DDV.

The scan driver SDV may generate the scan signals in response to the scan control signal, and the emission driver EDV may generate the emission signals in response to the emission control signal. The data driver DDV may receive the image signals of which data format is converted, and generate data voltages corresponding to the image signals in response to the data control signal.

The pixels PX may receive data voltages in response to the scan signals. The pixels PX may display an image by emitting light of the luminance corresponding to the data voltages in response to the emission signals. An emission time of the pixels PX may be controlled by the emission signals.

Figure 6:
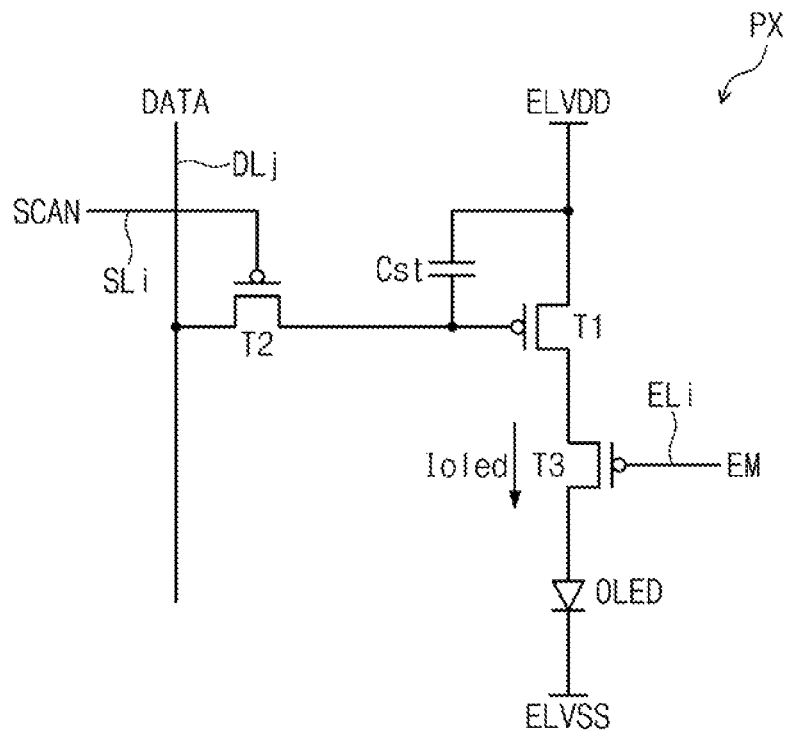
FIG. 6 is a circuit diagram of a pixel illustrated in FIG. 5.

FIG. 6 is a circuit diagram of a pixel illustrated in FIG. 5.

The circuit diagram of one pixel PX is illustrated as an example, but other pixels PX illustrated in FIG. 5 may have substantially the same circuit diagrams as the pixel PX shown in FIG. 6.

In relation to FIG. 6, the pixel PX may be connected to the corresponding scan line SLi among the scan lines SL1 to SLm, the corresponding data line DLj among the data lines DL1 to DLn, and the corresponding emission line ELi among the emission lines EL1 to Elm. Here, i is a natural number smaller than or equal to m, and j is a natural number smaller than or equal to n.

The pixel PX may include a light emitting element OLED, a driving transistor T1, a capacitive element Cst, a switching transistor T2, and an emission control transistor T3. For example, the light emitting element OLED may be an organic light emitting diode.

The source terminal of the driving transistor T1 receives a first voltage ELVDD, and the drain terminal of the driving transistor T1 may be connected to the source terminal of the emission control transistor T3. The gate terminal of the driving transistor T1 may be connected to the drain terminal of the switching transistor T2.

The gate terminal of the switching transistor T2 may be connected to the scan line SLi, and the source terminal of the switching transistor T2 may be connected to the data line DLj. A first electrode of the capacitive element Cst may be connected to the source terminal of the driving transistor T1, and a second electrode of the capacitive element Cst may be connected to the gate terminal of the driving transistor T1.

The gate terminal of the emission control transistor T3 may be connected to the emission line Eli, and the drain terminal of the emission control transistor T3 may be connected to the anode electrode of the light emitting element OLED. The cathode electrode of the light emitting element OLED may receive the second voltage ELVSS, and the second voltage ELVSS may be different from the first voltage ELVDD. For example, the second voltage ELVSS may be less than the first voltage ELVDD.

The switching transistor T2 may be turned on in response to the scan signal SCAN received through the scan line SLi. The turned-on switching transistor T2 may provide the data voltage DATA received through the data line DL to the gate terminal of the driving transistor T1. The capacitive element Cst may charge the data voltage DATA applied to the gate terminal of the driving transistor T1, and maintain the same after the switching transistor T2 is turned off.

The emission control transistor T3 may be turned on in response to the emission signal EM received through the emission line Eli. The turned-on emission control transistor T3 may play a role of providing the current Ioled flowing through the driving transistor T1 to the light emitting element OLED. The pixel PX may emit light during an application time of the emission signal EM. The light emission element OLED may emit light with the intensity that depends on the amount of the received current Ioled.

For example, the transistors T1 to T3 of the pixel PX are PMOS transistors, but exemplary embodiments of the present inventive concept are not limited thereto. The transistors T1 to T3 of the pixel PX may be NMOS transistors.

Figure 7:
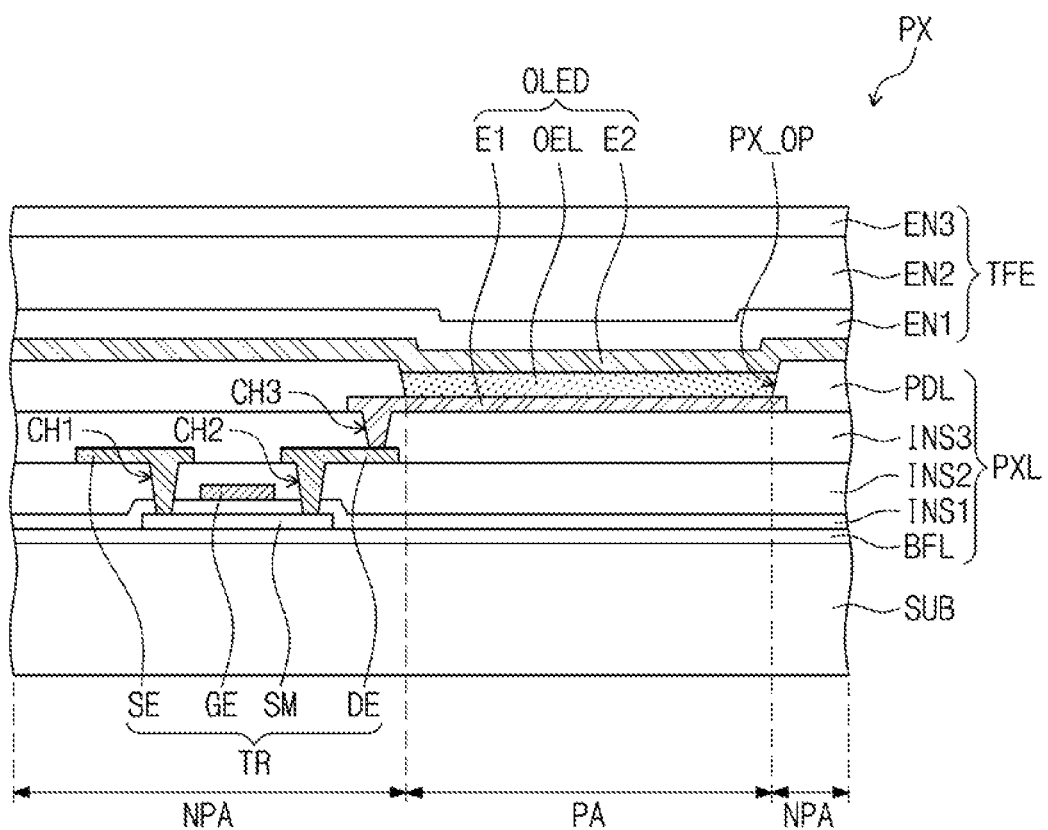
FIG. 7 schematically shows a cross-sectional configuration of the pixel shown in FIG. 6.

FIG. 7 schematically shows a cross-sectional configuration of the pixel shown in FIG. 6.

In relation to FIG. 7, the pixel PX may include a light emitting element OLED and a transistor TR connected thereto. The light emitting element OLED may include a first electrode E1, a second electrode E2, and an organic emission layer GEL disposed therebetween.

The pixel PX may be divided into a pixel area PA and a non-pixel area NPA surrounding the pixel area PA. The light emitting element OLED may be disposed in the pixel area PA, and the transistor TR may be disposed in the non-pixel area NPA. The transistor TR ma be an emission control transistor T3. The transistor TR and the light emitting element OLED may be disposed on the substrate SUB. A buffer layer BFL may be disposed on the substrate SUB, and include an inorganic material.

A semiconductor layer SM of the transistor TR may be disposed on the buffer layer BFL. The semiconductor layer SM may include a semiconductor of an inorganic material such as amorphous silicon or polysilicon, or an organic semiconductor. In addition, the semiconductor layer SM may include an oxide semiconductor. Although not shown in FIG. 7, the semiconductor layer SM may include a source region, a drain region, and a channel region between the source region and the drain region.

A first insulation layer INS1 may be disposed on the buffer layer BFL and the semiconductor layer SM to cover the semiconductor layer SM. For example, the first insulation layer INS1 may include an inorganic material. The gate electrode GE of the transistor TR, which overlaps the semiconductor layer SM, may be disposed on the first insulation layer INS1. The gate electrode GE may be disposed to overlap the channel region of the semiconductor layer SM.

The second insulation layer INS2 may be disposed on the first insulation layer INS1 and the gate electrode GE to cover the gate electrode GE. The second insulation layer INS2 may be an interlayer insulation layer. The second insulation layer INS2 may include an organic material and/or an inorganic material.

A source electrode SE and a drain electrode DE of the transistor TR may be separately disposed on the second insulation layer INS2. The source electrode SE may be connected to the source region of the semiconductor layer SM through a first contact hole CH1 penetrating through the first insulation layer INS1 and the second insulation layer INS2. The drain electrode DE may be connected to the drain region of the semiconductor layer SM through a second contact hole CH2 penetrating through the first insulation layer INS1 and the second insulation layer INS2.

A third insulation layer INS3 may be disposed on the second insulation layer INS2 to cover the source electrode SE and the drain electrode DE of the transistor TR. The third insulation layer INS3 may be a planarization layer that provides a substantially flat top surface, and may include an organic material.

A first electrode E1 may be disposed on the third insulation layer INS3. The first electrode E1 may be connected to the drain electrode DE of the transistor TR through a third contact hole CH2 penetrating through the third insulation layer INS3. For example, the first electrode E1 may be a pixel electrode or an anode electrode. For example, the first electrode E1 may include a transparent electrode or a reflective electrode.

A pixel definition layer PDL configured to expose a predetermined part of the first electrode E1 may be disposed on the first electrode E1 and the third insulation layer INS3. In the pixel definition layer PDL, an opening part PX_OP provided in the pixel definition layer PDL may expose the predetermined part of the first electrode E1.

The organic emission layer OEL may be disposed on the first electrode E1 in the opening part PX_OP. The organic emission layer OEL may generate light that may be red, green, or blue. However, exemplary embodiments of the present inventive concept are not limited thereto, and the organic emission layer OEL may also generate white light by combining organic materials for generating red, green, and blue colors.

A second electrode E2 may be disposed on the pixel definition layer PDL and the organic light emitting layer OEL. The second electrode E2 may be a common electrode or a cathode electrode. For example, the second electrode E2 may include a transparent electrode or a reflective electrode.

For example, when the display panel DP is a top emission organic light emitting display panel, the first electrode E1 may be formed of a reflective electrode, and the second electrode E2 may be formed of a transparent electrode. When the display panel DP is a bottom emission organic light emitting display panel, the electrode E1 may be formed of a transparent electrode, and the second electrode E2 may be formed of a reflective electrode. The first electrode E1 may be an anode that is a hole injecting electrode, and the second electrode E2 may be a cathode that is an electron injecting electrode.

The thin film encapsulation layer TFE may be disposed on the light emitting element OLED to cover the pixel PX. The thin film encapsulation layer TFE may include a first encapsulation layer EN1 disposed on the light emitting element OLED, the second encapsulation layer EN2 disposed on the first encapsulation layer EN1, and a third encapsulation layer EN3 disposed on the second encapsulation layer EN2.

For example, each of the first and third encapsulation layers EN1 and EN3 may include an inorganic material, and the second encapsulation layer EN3 may include an organic material. The thickness of the second encapsulation layer EN2 may be thicker than that of each of the first and third encapsulation layers EN1 and EN3. A layer between the substrate SUB and the thin film encapsulation layer TFE may be the pixel layer PXL.

The first voltage ELVDD may be applied to the first electrode E1, and the second voltage ELVSS may be applied to the second electrode E2. A hole and an electron injected to the organic emission layer OEL may be combined to form an exciton, and the light emitting element OLED may emit light while the exciton is transitioned from an excited state to the ground state. According to the flow of the current, the organic light emitting element OLED emits light of red, green and blue colors, and accordingly, an image may be displayed.

Figure 8:
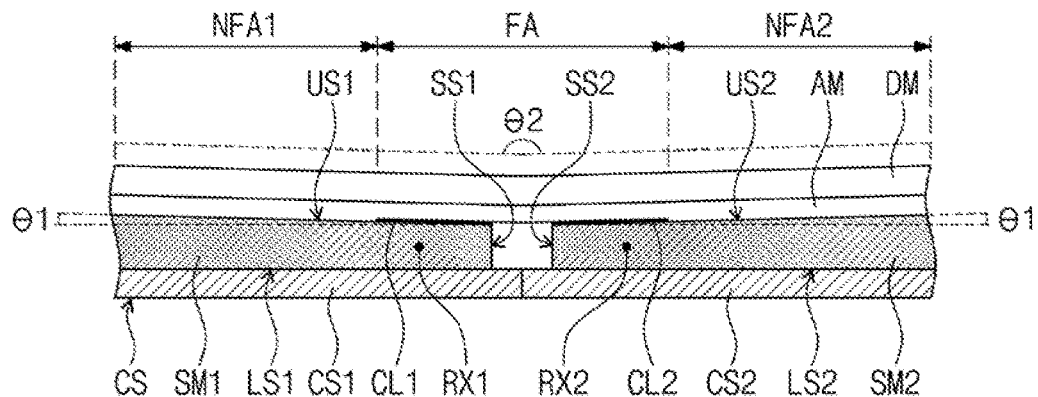
FIG. 8 illustrates an enlarged view of a folding area and first and second non-folding areas adjacent to the folding area shown in FIG. 3.
Figure 9:
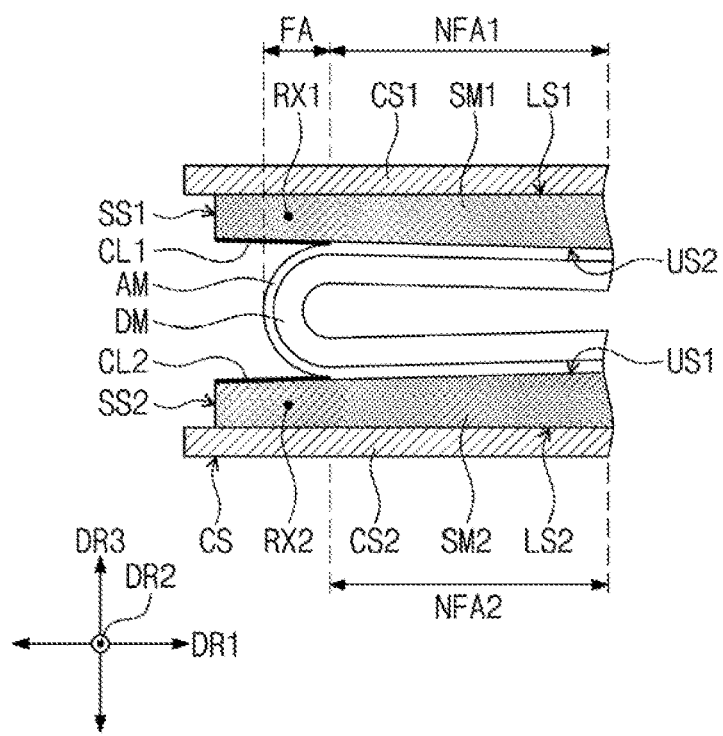
FIG. 9 illustrates a folded state of a display module shown in FIG. 8.

FIG. 8 illustrates an enlarged view of the folding area and the first and second non-folding areas adjacent to the folding area shown in FIG. 3. FIG. 9 illustrates a folded state of the display module shown in FIG. 8.

In relation to FIG. 8, the upper surface US1 of the first support portion SM1 may make a first angle $\theta_1$ with the first direction DR1. The upper surface US2 of the second support portion SM2 may make the first angle $\theta_1$ with the first direction DR1. For example, the upper surfaces US1 and US2 of the first and second support portions SM1 and SM2 may make the first angle $\theta_1$ with a virtual straight line extending in the first direction DR1. As an additional example, the upper surfaces US1 and US2 may make the first angle $\theta_1$ with respect to the lower surfaces LS1 and LS2 of the first and second support portions SM1 and SM2, respectively.

For example, although the angle made by the upper surface US2 of the second support portion SM2 with the first direction is described as the first angle $\theta_1$, exemplary embodiments of the present inventive concept are not limited thereto. For example, the angle made by the upper surface US2 of the second support portion SM2 with the first direction DR1 may be different from the first angle $\theta_1$.

As described above, in a state where the display module DM is unfolded, the display module DM may have a curved (e.g., bent) shape with a predetermined angle formed by the first and second support portion SM1 and SM2.

The state in which the display module DM is unfolded may be a state in which the first and second support portions SM1 and SM2 are not rotated about the first and second rotation axes RX1 and RX2. For example, the state in which the display module DM is unfolded may be a state in which the lower surface LS1 of the first support portion SM1 and the lower surface LS2 of the second support portion SM2 may be disposed on an identical plane.

While in the unfolded state, the folding area FA is bended about the center part of the display module DM by the first and second support portions SM1 and SM2, and the first non-folding area NFA1 and the second non-folding area NFA2 may make the second angle $\theta_2$. Accordingly, in a state where the display module DM is unfolded, the folding area FA may be disposed lower than the first and second non-folding areas NFA1 and NFA2. The display module DM illustrated in FIG. 8 may be an initial state in which a folding operation has not been performed once.

For example, the second angle $\theta_2$ made by the first non-folding area NFA1 and the second non-folding area NFA2 may be about 179 degrees to about 177 degrees. The second angle $\theta_2$ may be an unfolded angle of the display module DM. The second angle $\theta_2$ may be an angle made by an upper surface of the first non-folding area NFA1 and an upper surface of the second non-folding area NFA2 of the display module DM. A sum of the first angle $\theta_1$ and the second angle $\theta_2$ may be about 180 degrees.

In relation to FIG. 9, the first support portion SM1 rotates about the first rotation axis RX1, the second support portion SM2 rotates about the rotation axis RX2, and thus, the display module DM may be folded. The display module DM may be in-folded so that the first non-folding area NFA1 and the second non-folding area NFA face each other. For example, the display module DM may be folded such that the upper surface of the first non-folding area NFA1 faces the upper surface of the second non-folding area NFA2.

As described above, since the first and second coating layers CL1 and CL2 are not attached to the adhesive member AM, when the display module DM is folded, the first and second coating layers CL1 and CL2 may be apart from the adhesive member AM. Accordingly, parts of the first and second support portions SM1 and SM2, which overlap the folding area FA, may be separated from the adhesive member AM by the first and second coating layers CL1 and CL2, when the display module DM is folded.

When the first and second coating layers CL1 and CL2 are not provided to the first and second support portions SM1 and SM2, parts of the first and second support portions SM1 and SM2, which overlap the folding area FA, are attached to the adhesive member AM. The first and second support portions SM1 and SM2 may be a rigid type to support a flexible display module DM. When the parts of the first and second support portions SM1 and SM2, which overlap the folding area FA, are attached to the adhesive member AM, it may be difficult to fold the display module DM.

However, in an exemplary embodiment of the present inventive concept, the parts of the first and second support portions SM1 and SM2, which overlap the folding area FA, are not attached to the adhesive member AM by the first and second coating layers CL1 and C12, and thus, the display module DM may be easily folded.

Figure 10:
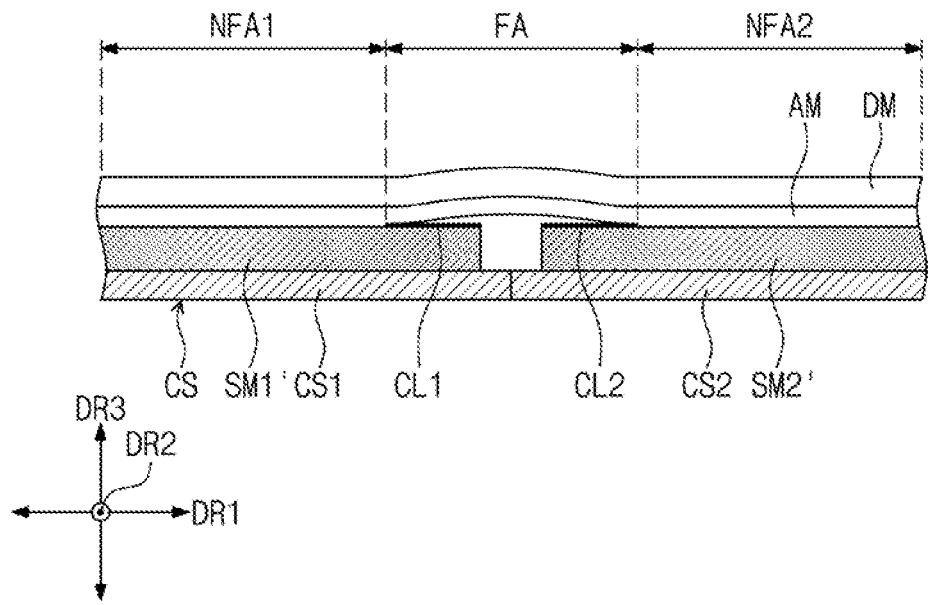
FIG. 10 illustrates a display module disposed on comparative support portions according to a comparative example.
Figure 11:
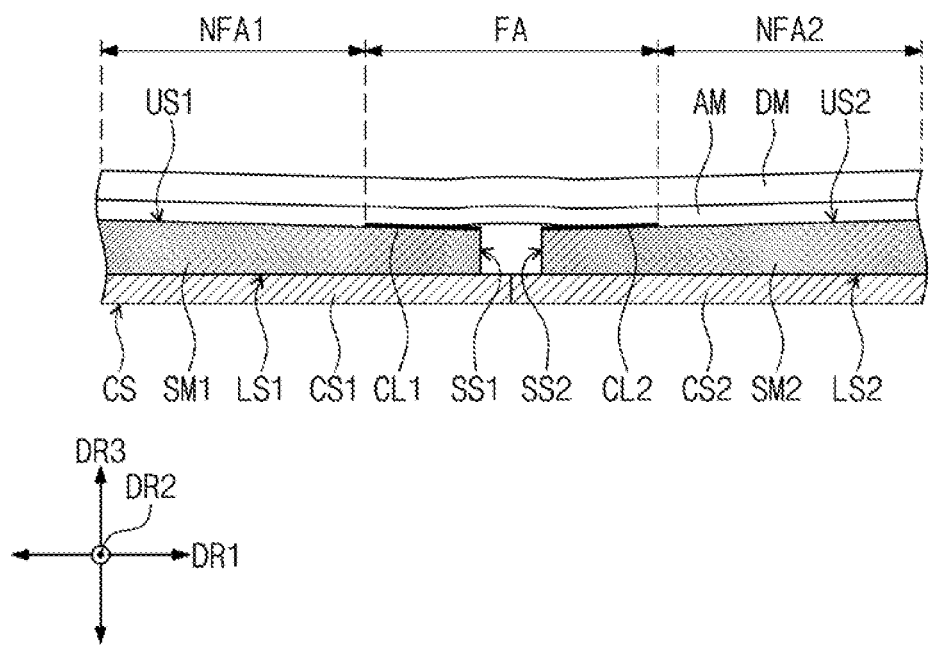
FIG. 11 illustrates a state in which the display module shown in FIGS. 8 and 9 has been repeatedly folded and unfolded.

FIG. 10 illustrates a display module disposed on comparative support portions according to a comparative example. FIG. 11 illustrates a state in which the display module shown in FIGS. 8 and 9 has been repeatedly folded and unfolded.

In relation to FIG. 10, unlike the first and second support portions SM1 and SM2, comparative support portions SM1' and SM2' have flat upper layers. The display module DM may be disposed on the comparative support portions SM1' and SM2'.

When the display module DM is repeatedly folded and unfolded, the folding area FA may be modified or deformed. For example, the folding area FA may be stretched. Since the comparative support portions SM1' and SM2' have flat surfaces, the modified folding area FA may protrude upward. For example, the stretched portion of the folding area may protrude upward. Accordingly, the modified folding area FA may be visually recognized to the user, and the display quality may have degraded.

In relation to FIG. 11, as described above, the upper surfaces US1 and US2 of the first and second support portions SM1 and SM2 have inclined planes, and thus the center part of the display module DM may subside into a lower portion in the folding area FA. For example, the lower portion may correspond to a portion of the first support portion SM1 adjacent to the first side surface SS1 and a portion of the second support portion SM2 adjacent to the first side surface SS2 overlapping the folding area FA. Since the center part of the display module DM subsides into the lower portion, the protruding portion of the folding area FA may subside into the lower portion. Accordingly, since the protruding portion of the folding area FA subsides into the lower portion, the protruding portion illustrated in FIG. 10 may be prevented.

Even when the folding area FA is modified, since the center part of the display module DM subsides into the lower portion, unlike the folding area FA illustrated in FIG. 10, the folding area FA in FIG. 11 may further subside into the lower portion and the protruding portion of the folding area FA may become small. As the protruding portion of the folding area FA becomes smaller, the modification of the folding area FA may not be visually recognized.

Consequently, the display device DD according to an exemplary embodiment of the present inventive concept may prevent the modified folding area FA from being visually recognized.

Figure 12:
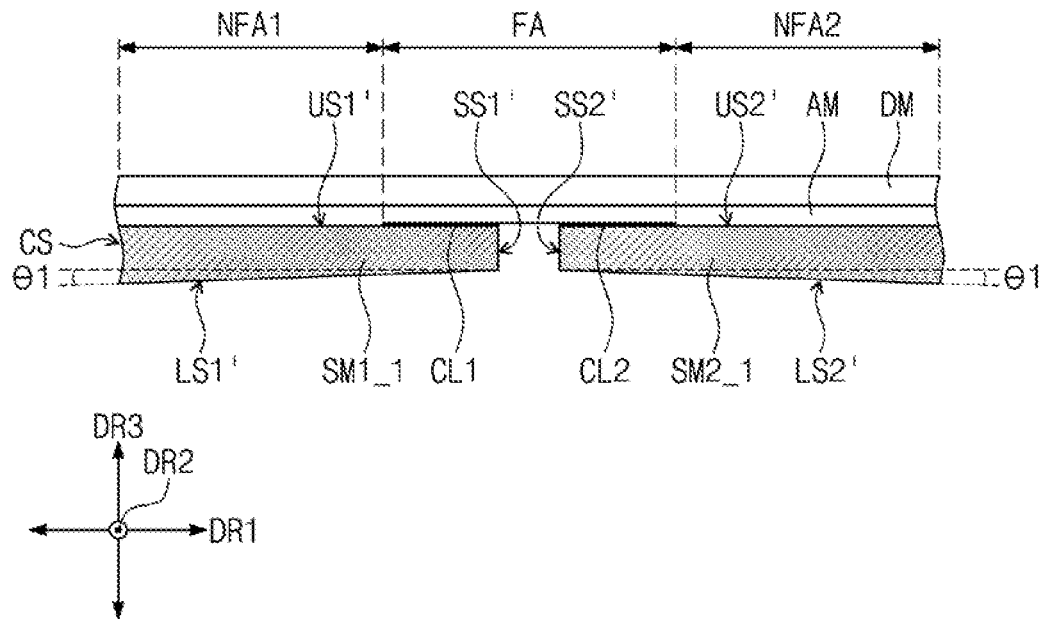
FIGS. 12 and 13 illustrate a display device according to an exemplary embodiment of the present inventive concept.
Figure 13:
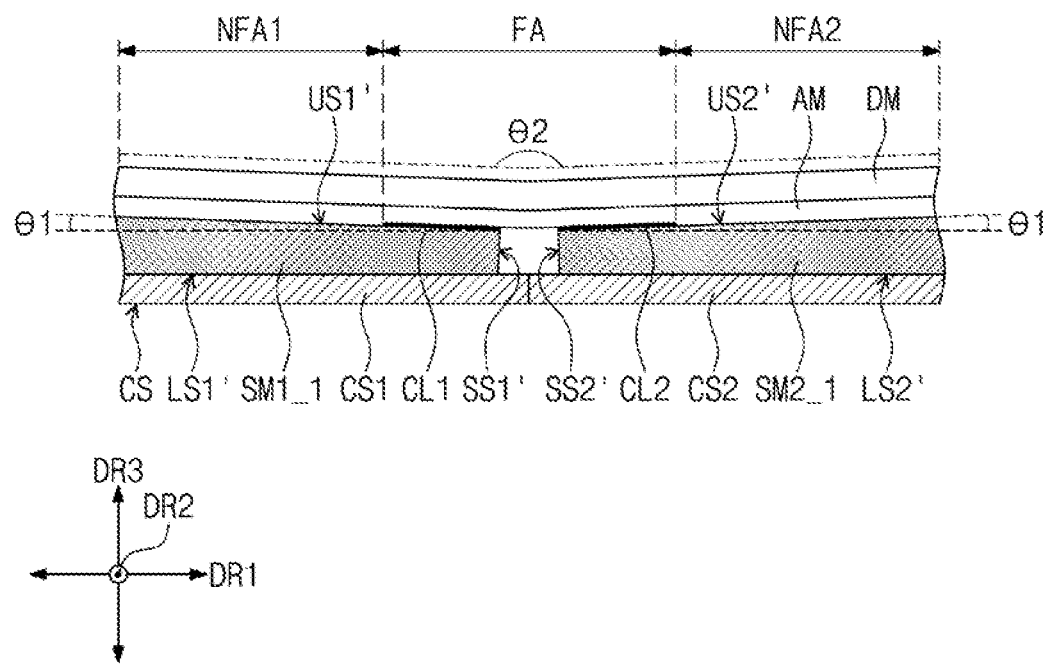

FIGS. 12 and 13 illustrate a display device according to an exemplary embodiment of the present inventive concept.

For convenience of description, FIGS. 12 and 13 are illustrated as enlarged drawings corresponding to FIGS. 8 and 9. Other configurations except for the shape of the first and second support portions SM1 and SM2 may be substantially the same as those illustrated in FIGS. 8 and 9. Accordingly, configurations of the first and second support portions SM1 and SM2 will be mainly described below, and like element and/or configurations are illustrated using like reference signs.

In relation to FIG. 12, the thickness of the first support portion SM1_1 may increase from one side surface SS1' of the first support portion SM1_1 toward the other side surface (e.g., an opposite side surface) of the first support portion SM1_1. The thickness of the second support portion SM2_1 may increase from one side surface SS2' of the second support portion SM2_1 toward the other side surface of the second support portion SM2_1.

Before the first and second support portions SM1_1 and SM2_2 and the display module DM are accommodated in the case CS, the upper surface US1' of the first support portion SM1_1 and the upper surface US2' of the second support portion SM2_1 may have planes parallel to the first and second directions DR1 and DR2.

The one side surface SS1' of the first support portion SM1_1 may be substantially perpendicular to the upper surface US1' of the first support portion SM1_1. The one side surface SS2' of the second support portion SM2_1 may be substantially perpendicular to the upper surface US2' of the second support portion SM2_1.

The lower surface LS1' of the first support portion SM1_1 may be an inclined plane making the first angle $\theta_1$ with the first direction DR1. The height of the lower surface LS1' of the first support portion SM1_1 may become lower as it proceeds front the one side surface SS1' of the first support portion SM1_1 to the other side surface of the first support portion SM1_1.

The lower surface LS2' of the second support portion SM2_1 may be an inclined plane making the first angle $\theta_j$ with the first direction DR1. The height of the lower surface LS2' of the second support portion SM2_1 may become lower as it proceeds from the one side surface SS2' of the second support portion SM2_1 to the other side surface of the second support portion SM2_1.

In relation to FIG. 13, when the first and second support portions SM1_1 and SM2_2, and the display module DM are accommodated in the case CS having a flat lower part, the lower suffices LS1' and LS2' of the first and second support portions SM1_1 and SM2_1 may have planes parallel to the first and second directions DR1 and DR2. The upper surface US1' of the first support portion SM1_1 and the upper surface US2' of the second support portion SM2_1 may be inclined planes symmetric to each other, and each of the upper surfaces US1' and US2' makes the first angle $\theta_1$ with the first direction DR1.

Since the one side surfaces SS1' and SS2' of the first and second support portions SM1_1 and SM2_1 are respectively perpendicular to the upper surfaces US1' and US2' of the first and second support portions SM1_1 and SM2_1, the one side surfaces SS1' and SS2' may not be parallel to the third direction DR3, and the one side surfaces SS1' and SS2' may make an angle with the third direction DR3.

Substantially, in a state of being accommodated in the case CS, the first and second support portions SM1_1 and SM1_1 may have the same shapes as the first and second support portions SM1 and SM2, except for the one side surfaces SS1' and SS2'. Accordingly, the folding area FA may further subside into the lower portion to cause the protruding part of the folding area FA to become smaller, and the modified folding area FA may be prevented from being visually recognized.

According to exemplary embodiments the present inventive concept, the thickness of the first support portion disposed in a lower portion of the display module increases from one side of the first support portion toward the other side of the first support portion, and the thickness of a second support portion increases from one side of the second support portion toward the other side of the second support portion. Accordingly, when the display module is unfolded, the modified folding area of the display module subsides into the lower portion to prevent the modified folding area from being visually recognized.

While the present inventive concept has been particularly shown and described with reference to exemplary embodiments thereof, it will be apparent to those of ordinary skill in the art that various changes in form and detail may be made thereto without departing from the spirit and scope of the present inventive concept as defined by the following claims.

What is claimed is:

1. A display device comprising:
   a first support portion;
   a second support portion arranged in a first direction with the first support portion;
   a display panel disposed on the first and second support portions; and
   a hinge configured to provide first and second rotation axes to the first and second support portions, respectively, the first and second rotation axes extending in a second direction crossing the first direction,
   wherein a thickness of the first support portion increases from a first side surface of the first support portion toward a second side surface of the first support portion, and a thickness of the second support portion increases from a first side surface of the second support portion toward a second side surface of the second support portion, wherein the first side surface of the second support portion faces the first side surface of the first support portion, wherein an entirety of an upper surface of the first support portion has a constant slope.

2. The display device of claim 1, wherein a shape of the first support portion is symmetric to the second support portion about a center part of the display panel.

3. The display device of claim 1, wherein lower surfaces of the first and second support portions each have a plane that is parallel to the first and second directions.

4. The display device of claim 3, wherein the first side surface of the first support portion and the lower surface of the first support portion are substantially perpendicular to each other.

5. The displays device of claim 3, wherein the first side surface of the second support portion and the lower surface of the second support portion are substantially perpendicular to each other.

6. The display device of claim 3, wherein upper surfaces of the first and second support portions are inclined planes that make a first angle with the first direction, wherein the upper surface of the first support portion and the upper surface of the second support portion are symmetric to each other with respect to a center part of the display panel.

7. The display device of claim 6, wherein the first angle is about 0.5 degree to about 1.5 degrees.

8. The display device of claim 6, wherein the first side surface of the first support portion and the upper surface of the first support portion are substantially perpendicular to each other.

9. The display device of claim 6, wherein the first side surface of the second support portion and the upper surface of the second support portion are substantially perpendicular to each other.

10. The display device of claim 1, wherein the display panel comprises:
    a first non-folding area;
    a second non-folding area; and
    a folding area disposed between the first non-folding area and the second non-folding areas and overlapping the first and second rotation axes.

11. The display device of claim 10, further comprising:
    an adhesive member disposed between the display panel and the first support portion and between the display panel and the second support portion.

12. The display device of claim 11, further comprising:
    a first coating layer disposed between a part of the upper surface of the first support portion and the adhesive member, wherein the part of the upper surface of the first support portion is adjacent to the first side surface of the first support portion; and
    a second coating layer disposed between a part of an upper surface of the second support portion and the adhesive member, wherein the part of the upper surface of the second support portion is adjacent to the first side surface of the second support portion.

13. The display device of claim 12, wherein the first and second coating layers overlap the folding area and are not attached to the adhesive member at the folding area.

14. The display device of claim 10, wherein
    the first rotation axis is provided at a part of the first support portion, wherein the part of the first support portion is adjacent to the first side surface of the first support portion, and
    the second rotation axis is provided at a part of the second support portion, wherein the part of the second support portion is adjacent to the first side surface of the second support portion.

15. The display device of claim 14, wherein the first and second support portions rotate about the first and second rotation axes, respectively, and the display panel is configured to fold inward so that the first and second non-folding areas face each other.

16. The display device of claim 15, wherein when the display panel is in an unfolded mode, an angle made by the first non-folding area and the second non-folding area is greater than about 177 degrees and less than 180 degrees.

17. The display device of claim 1, further comprising:

a case configured to accommodate the display panel and the first and second support portions, wherein an upper surface of the display panel comprises a display area and a non-display area configured to at least partially surround the display area, and the case covers the non-display area.

18. A display device comprising:

a first support portion;

a second support portion arranged in a first direction with the first support portion; and a display panel disposed on the first and second support portions, wherein a lower surface of the first support and a lower surface of the second support portion have planes defined by the first direction and a second direction crossing the first direction, and an upper surface of the first support and an upper surface of the second support portion make a first angle with the first direction and are symmetric to each other, wherein an entirety of the upper surface of the second support portion is even.

19. The display device of claim 18, wherein a height of the upper surface of the first support portion increases from a first side surface of the first support portion toward a second side surface of the first support portion, a height of the upper surface of the second support portion increases from a first side surface of the second support portion toward a second side surface of the second support portion, and the first side surface of the first support portion faces the first side surface of the second support portion.

20. The display device of claim 19, wherein the first side surface of the first support portion and the lower surface of the first support portion are substantially perpendicular to each other, and the first side surface of the second support portion and the lower surface of the second support portion are substantially perpendicular to each other.

\* \* \* \* \*